United States Patent [19]

Yamauchi et al.

[11] 4,410,280
[45] Oct. 18, 1983

[54] ELECTRIC FOOD PREPARATION APPARATUS

[75] Inventors: Terukazu Yamauchi, Minoo; Hirofumi Nakakura, Takarazuka, both of Japan

[73] Assignee: Matsushita Electric Industrial Co., Ltd., Osaka, Japan

[21] Appl. No.: 279,464

[22] Filed: Jul. 1, 1981

[30] Foreign Application Priority Data

Jul. 9, 1980 [JP] Japan .............................. 55-97425[U]

[51] Int. Cl.³ .............................................. B01F 7/04
[52] U.S. Cl. .................................. 366/314; 366/205; 241/282.1
[58] Field of Search .................. 99/348, 485; 366/347, 366/279, 314, 197, 205, 206, 207, 245, 247, 249, 251; 241/37.5, 282.1

[56] References Cited

U.S. PATENT DOCUMENTS

| 3,024,010 | 3/1962 | Sperling | 241/282.1 |
| 3,528,469 | 9/1970 | Mantelet | |
| 3,892,365 | 7/1975 | Verdun | 241/37.5 |
| 4,111,372 | 9/1978 | Hicks | 241/37.5 |
| 4,113,188 | 9/1978 | Belinkoff | 241/37.5 |
| 4,196,342 | 4/1980 | Chailloux | 99/348 |

Primary Examiner—Robert W. Jenkins
Attorney, Agent, or Firm—Stevens, Davis, Miller & Mosher

[57] ABSTRACT

The present invention relates to an electric food preparation apparatus such as a food processor, juicer or the like. An annular cavity is formed in the fitting portion between the container body and the container lid. The annular cavity is communicated with the interior of the container body through communication passages. Fluid guiding members are disposed at the upstream side of respective communication passages to generate negative pressure in the respective communication passages. The liquid leaking outside is induced back into the container body through the communication passages so that external leaking of the liquid is prevented.

14 Claims, 16 Drawing Figures

_4,410,280_

ELECTRIC FOOD PREPARATION APPARATUS

BACKGROUND OF THE INVENTION

The present invention relates to a food preparation apparatus such as a food processor, juicer or the like adapted to cut, stir and mix various food materials such as vegetables.

Such apparatus, particularly food processors, are designed mainly for processing of highly viscous food materials such as meat, fish meat and the like, as well as solid and hard material such as vegetables, and can have only limited use for the stirring of liquid materials because of leaking of the liquid through the fitting portion between the container and the lid. Some food processors are provided with special parts such as rubber packing to prevent, such leaking. This, however, cannot provide satisfactory results because the packing hinders the tight fit of the lid to the container, particularly when the container and the lid have a complicated structure.

Various measures are proposed to prevent leaking of the liquid through the fitting portion between the container and the lid. These measures, however, generally require precision of parts or additional parts resulting in an impractically complicated construction.

SUMMARY OF THE INVENTION

Accordingly, an object of the invention is to provide a food preparation apparatus capable of overcoming the above-described problems of the prior art.

According to the invention there is provided an electric food preparation having a motor, a main body accommodating the motor, a container mounted on the main body, a rotating member adapted to be rotatively driven in the container by the motor, and a container lid adapted to be mounted on the container to cover the upper opening of the container, the lid being adapted to fit at its opening brim to the inner periphery of the container in such a manner that an annular cavity is formed in the fitting portion between the lid and the container, the annular cavity being in communication with the interior of the container through communication passages, and having a fluid guiding member disposed at the upstream side of each communication passage as viewed in the direction of rotation of the rotating member so as to generate a negative pressure in each communication passage.

The above and other objects, as well as advantageous features of the invention will become clear from the following description of the preferred embodiments of the invention given by way of example with reference to the accompanying drawings.

DESCRIPTION OF THE PREFERRED EMBODIMENTS

Figure 1:
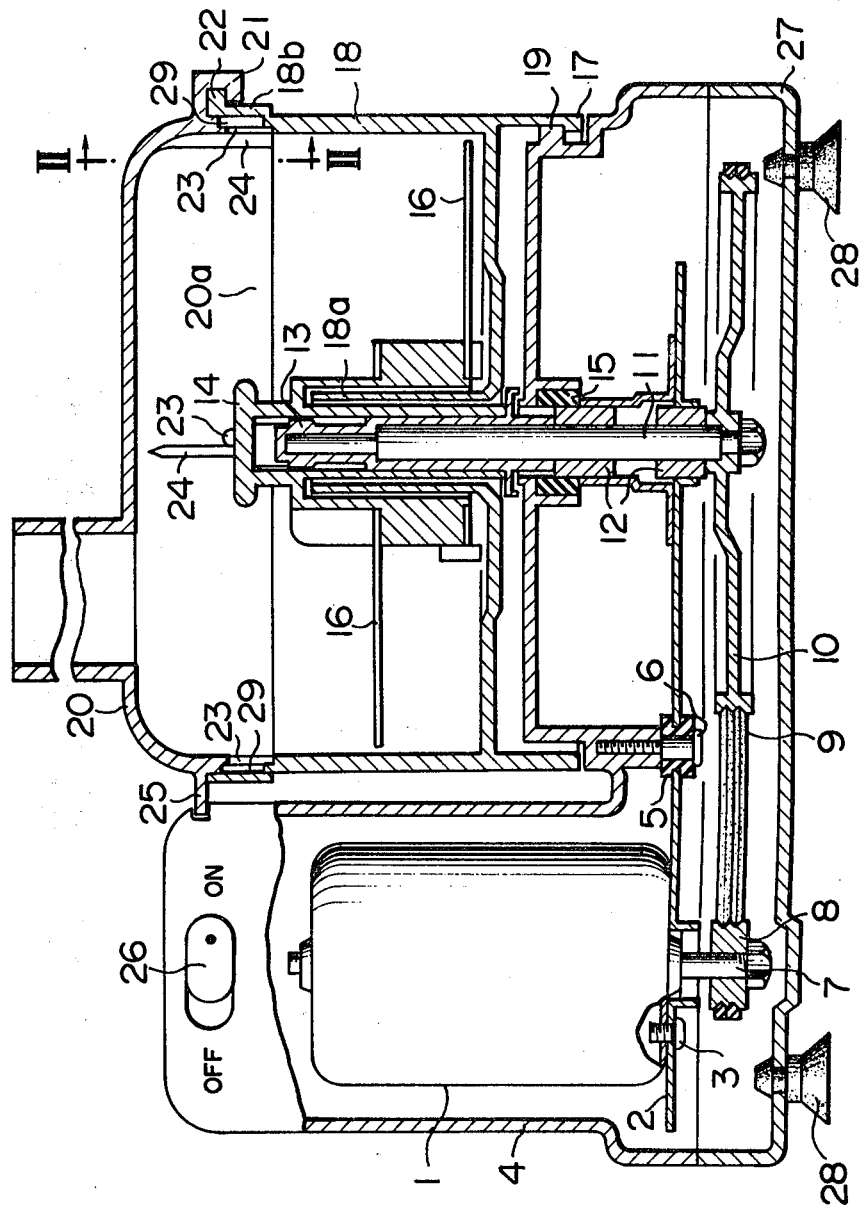
FIG. 1 is a sectional view of an apparatus in accordance with an embodiment of the invention.

Referring to FIG. 1 showing a food processor constructed in accordance with a first embodiment of the invention, a reference numeral 1 designates an electric motor secured to a chassis 2 by means of screws 3. The chassis 2 is attached to a main body 4 through rubber bushings 5 by means of screws 6. The motor 1 has a shaft 7 to which attached is a small pulley 8 which is adapted to drive a large pulley 10 through a belt 9. The large pulley 10 is attached to a main spindle 11. The spindle 11 is mounted on the chassis 2 by means of oil-less bearings 12. The end of the spindle 11 opposite to the large pulley 10 projects above the main body 4.

The one of oil-less bearings 12 is located in the main body 4 by means of a rubber coupling 15. A cutter mount 14 is detachably secured to a connector 13 attached to the spindle 11, in such a manner that a projection formed at the upper portion of the connector 13 fits in the groove in the cutter mount 14 to transmit the torque of the motor. Two cutter blades 16 in the form of knife blades are attached in a vertically staggered manner to the cutter mount 14. The container 18 is provided at its lower portion with a hook-shaped projection 17 which is coupled to a projection 19 on the main body 4 to provide a bayonet coupling between the main body 4 and the container 18. A cylindrical portion 18a protrudes from the center of the bottom of the container 18 to separate the spindle 11 from the cutter mount 14.

A container lid 20 is provided at its lower portion with a hook-shaped projection 21 which is adapted to engage with a projection 22 provided at the upper part of the outer periphery of the container 18.

The brim 20a of the opening of the container lid 20 fits in the brim 18b of the opening of the container body 18 so as to form a labyrinth fitting therebetween. An annular cavity 29 is formed in the labyrinth fitting portion and is communicated with the interior of the container body 18 through a plurality of communication passages 23 such as notched holes opened at their lower ends, circular holes or elliptic holes, formed in the brim 20a of the container lid 20. A plurality of fluid guiding members 24 are formed on the inner peripheral surfaces of the container lid 20 integrally with the latter. These fluid guiding members 24 are located at the upstream sides of respective communication passages 23 as viewed in the direction of rotational flow of the liquid caused by the rotation of the cutters 16, so as to generate a negative pressure in each communication passage 23. A reference numeral 25 designates a projection adapted to operate a safety switch (not shown) when the container lid 20 is correctly mounted on the container body 18, while a reference numeral 26 denotes a power supply switch. Reference numerals 27 and 28 denote, respectively, a backing plate covering the lower side of the main body and legs.

Figure 2:
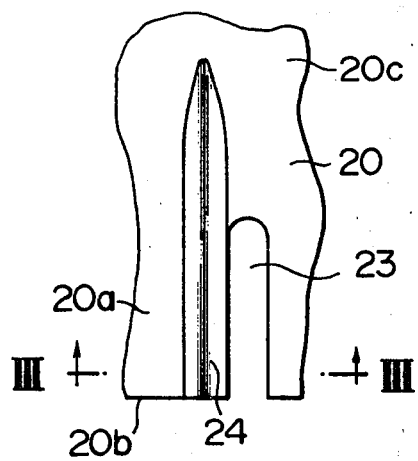
FIG. 2 is a front elevational view of an essential part of the apparatus shown in FIG. 1, as viewed along the line II—II of FIG. 1.
Figure 3:
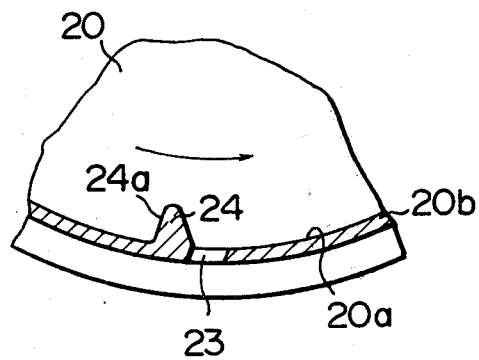
FIG. 3 is a sectional view taken along the line III—III of FIG. 2.
Figure 4:
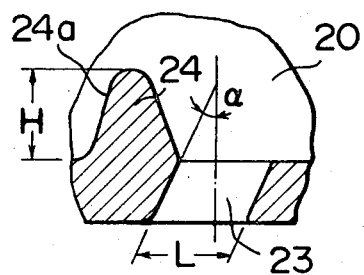
FIG. 4 is a fragmentary enlarged sectional view of the embodiment shown in FIG. 3.

The details of the arrangement of the fluid guiding member 24 and the communication passage 23 are shown in FIGS. 2 to 4. Each fluid guiding member 24 is located adjacent to a corresponding communication passage 23 at the upstream side of the latter as viewed in the direction of rotational flow of the liquid caused by the rotation of the cutter blades 16, indicated by arrow, and extend vertically from the opening edge 20b to the ceiling 20c of the container lid 20. At least the upstream side 24a of the fluid guiding member 24 is tapered. Furthermore, the opening of the communicating passage 23 is inclined at an angle $\alpha$ in the same direction as the rotation of the cutter. In addition, the height H of the fluid guiding member 24 is selected to be equal to or greater than the breadth L of the communicating passage 23, such that the combination of the height H and inclination angle $\alpha$ provides a good effect of establishment of negative pressure in the communicating passage 23.

Hereinafter, an explanation will be made as to the operation of the apparatus of this embodiment.

First of all, the container body 18 is bayonet-coupled to the main body 14, with the cutter mount 14 fitted to the connector 13. Then, the material to be processed such as meat, fish meat, liquid or the like is placed in the container body 18, and the container lid 20 is fitted to the container body by rotation.

Then, as the power source switch is closed, the electric motor 1 starts to rotate so that the torque is transmitted from the motor 1 to the spindle 11 through the belt 9. The torque is further transmitted from the spindle 11 to the cutter mount 14 so that the cutter blades 16 are rotated to cut and stir the material such as meat, vegetable, liquid or the like.

In the conventional food processor, as stated before, there is a problem of leaking of the material to the outside of the food processor particularly when the material is one of the lower viscosity such as water.

This problem, however, is overcome by the present invention, as will be understood from the following description. Namely, in the food processor of the invention, since there is provided an annular cavity 29 in the labyrinth fitting part between the container body 18 and the container lid 20, and since the annular cavity is communicated with the interior of the container body 28 through the communication passages 23, the liquid leaking into the annular cavity and tending to leak further to the outside is conveniently induced into the container body 18 through the communication passages 23 because a negative pressure is established in each communication passage as the liquid flows in the direction of the arrow shown in FIG. 3 during the stirring, due to the presence of the fluid guiding member 24 at the upstream side of each communication passage.

The induction of the liquid back into the container body 18 is ensured by the inclination or taper of the upstream side surface of the fluid guiding member 24 and the inclined orientation of the communication passage.

During stirring, the liquid stirred by the cutter blades 16 gradually ascends in the container body in a spiral manner. The ascending flow then collides with the fluid guiding member 24 extending to the ceiling of the container body 18 and is deflected back into the container body 18. Thus, the fluid guiding members 24 serve also to enhance the stirring effect.

In the case where the communication passage has a form of a hole opened at its lower end, when the cutter blades stop rotating the liquid in the annular cavity 29 naturally drops into the container body 18 without fail. From this point of view, this form of the communication passage is preferred to the circular and elliptic holes. Even when the communication passage 23 is in the form of a circular or elliptic hole, it is possible to obtain an equivalent effect to that achieved by the illustrated embodiment, provided that the hole is positioned to extend to a level below the lower end of the annular cavity 29.

Figure 5:
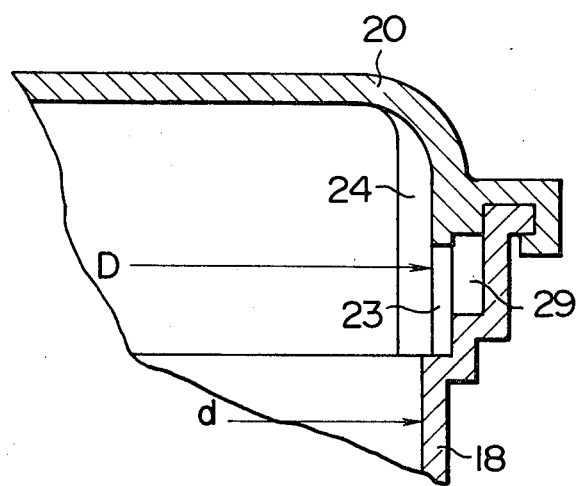
FIG. 5 is a fragmentary sectional view of a modification of the first embodiment.

FIG. 5 shows a modification in which the container lid 20 has an inner diameter D equal to or greater than the inner diameter d of the container body 18, so that the flow of liquid caused by the rotation of the cutter blades 16 moves smoothly from the interior of the container body 18 into the interior of the container lid 20, so that the flow of the liquid into the annular cavity is advantageously decreased to reduce the leak.

Figure 6:
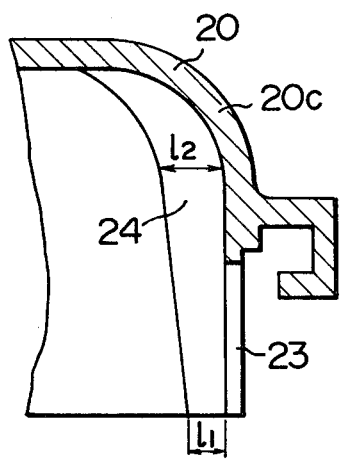
FIG. 6 is a fragmentary sectional view of another modification of the first embodiment.

FIG. 6 shows another modification in which the radial height of the fluid guiding member 24 is varied along the vertical length thereof such that the portion closer to the ceiling 20c of the lid 20 has a radial height $l_2$ greater than the radial height $l_1$ of the portion closer to the lower edge of the lid 20. This arrangement is effective in surely deflecting the ascending liquid into the container body 18, to ensure a higher stirring effect.

Figure 7:
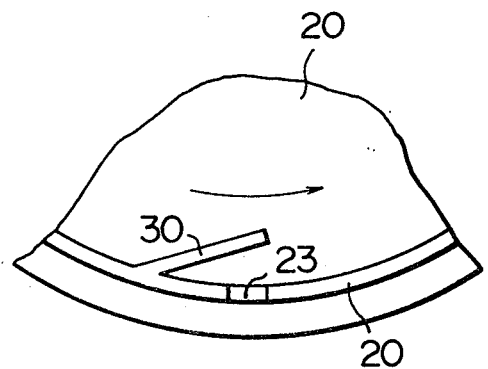
FIG. 7 is a fragmentary sectional view of still another modification of the first embodiment.

FIG. 7 shows still another modification in which each fluid guiding member 24 is substituted by an inclined plate 30. The end of the inclined plate 30 extends to the space above the communication passage 23.

Figure 8:
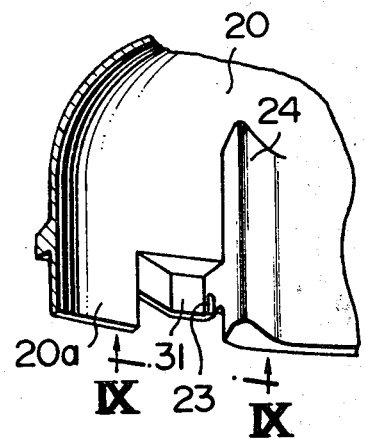
FIG. 8 is a fragmentary perspective view of a cooking apparatus in accordance with a second embodiment of the invention.
Figure 9:
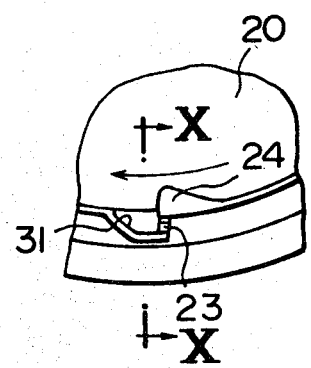
FIG. 9 is a bottom view as viewed along the line IX—IX of FIG. 8.
Figure 10:
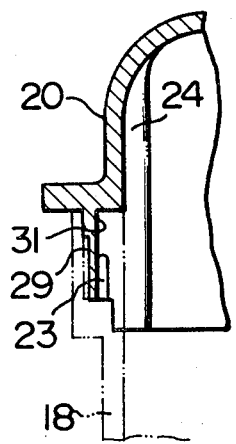
FIG. 10 is a sectional view taken along the line X—X of FIG. 9.
Figure 11:
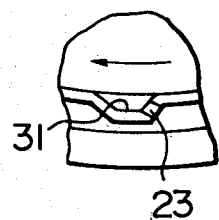
FIG. 11 is a fragmentary bottom view of a modification of the second embodiment.

FIGS. 8 to 10 in combination show a second embodiment of the invention, in which a part of the brim 20a of the opening of the container lid 20 is projected radial outwardly in a stepped manner to form a recess 31, and the communication passage 23 is formed at the upstream side of the recess 31 as viewed in the direction of rotation of the cutter blades 16. It will be understood by those skilled in the art that this arrangement further ensures the establishment of negative pressure in the communication passage 23. In the second embodiment, it is possible to obtain a sufficient leak prevention effect even when the fluid guiding member 24 is lacking as in a modification shown in FIG. 11. Although in FIGS. 8 to 11 the direction of rotation of the cutter blades is reverse to that shown in FIG. 3, it will be understood that this change of flowing direction does not matter at all in the principles of the invention.

Figure 12:
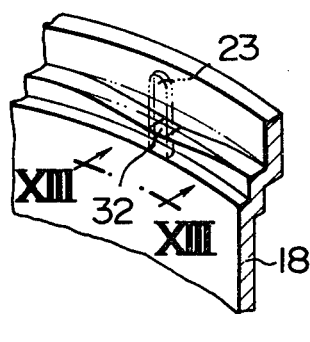
FIG. 12 is a fragmentary perspective view of a third embodiment of the invention.
Figure 13:
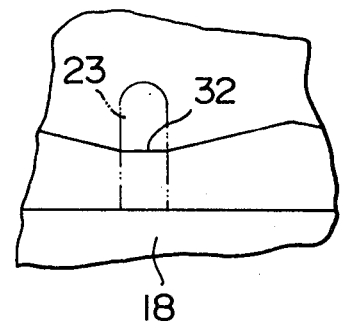
FIG. 13 is a front elevational view as viewed along the line XIII—XIII of FIG. 12.

FIGS. 12 and 13 show a third embodiment of the invention in which the portions 32 of the bottom of the annular cavity 29 opposite to the communication passages 23 are recessed from the ordinary level of the bottom to facilitate the introduction of the liquid in the cavity toward the communication passages.

Figure 14:
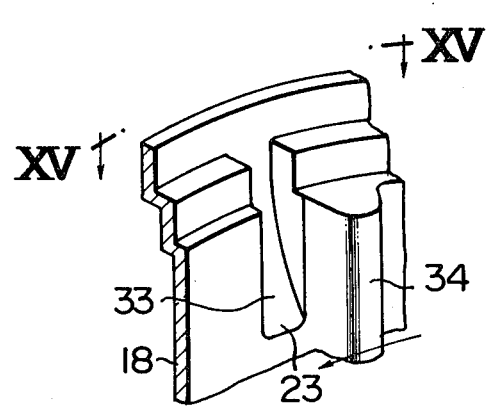
FIG. 14 is a fragmentary perspective view of a fourth embodiment.
Figure 15:
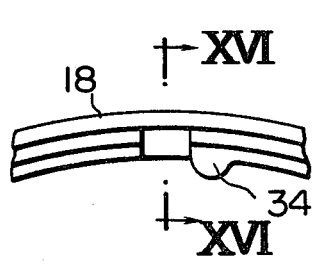
FIG. 15 is a plan view as viewed along the line XV—XV of FIG. 14.
Figure 16:
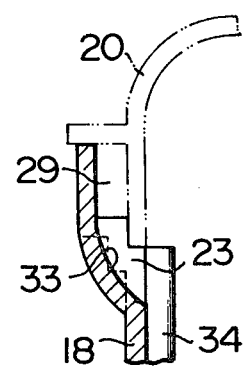
FIG. 16 is a sectional view taken along the line XVI—XVI of FIG. 15.

FIGS. 14 to 16 show a fourth embodiment in which the opening brim of the container body 18 is partly recessed toward the outer side to form a recess 33 constituting the cavity 29, while no specific work is done on the container lid 20. The lower end of the recess 33 is opened to form the communication passage 23. On the other hand, the fluid guiding member 34 is formed on the inner peripheral surface of the container body 18 adjacent to the communication passage and at the upstream side as viewed in the direction of rotational flow of the liquid caused by the rotation of the cutter blades. It will be clear to those skilled in the art that this fourth embodiment can provide an equivalent leak prevention effect to that performed by the foregoing embodiments.

Although the invention has been described through specific embodiments applied to food processors, the invention can equally be applied to juicers, mixers and other similar food preparation apparatus.

What is claimed is:

1. An electric food preparation apparatus comprising: an electric motor; a main body containing said electric motor; a container body mounted on said main body; a rotating member adapted to be rotatively driven in said container body by said electric motor; and a container lid adapted to be mounted on said container body to cover the upper opening of said container body, said container lid being so structured as to fit its opening brim to the inner periphery of said container body in such a manner that an annular cavity is formed in the fitting portion between said container body and said container lid, the annular cavity being in communication with the interior of the container body through communication passages; said apparatus further comprising fluid guiding members disposed at the upstream side of each communication passage and adjacent to each communication passage as viewed in the direction of rotation of said rotating member, so as to generate a negative pressure in each communication passage.

2. An apparatus according to claim 1, wherein each communication passage includes a hole formed in the opening brim of said container lid and opened at its lower end, and said fluid guiding member is formed to extend along said hole.

3. An apparatus according to claim 2, wherein said fluid guiding member has a radial height equal to or greater than the opening breadth of said communication passage.

4. An apparatus according to claim 2, wherein said fluid guiding member is constituted by an inclined plate inclined toward said communication passage.

5. An apparatus according to claim 2, wherein the bottom of said annular cavity is recessed at portions opposing said communication passages from the ordinary level of the bottom.

6. An apparatus according to claim 1, wherein said fluid guiding member is formed on the inner peripheral surface of said container lid so as to extend vertically from the opening edge of said container lid to the ceiling of the latter.

7. An apparatus according to claim 6, wherein the radial height of the portion of said fluid guiding member closer to the ceiling of said container lid is larger than that of the portion of said fluid guiding member closer to the lower end of said container lid.

8. An apparatus according to claim 1, wherein said communication passage has an opening oriented in the same direction as said rotating member rotates.

9. An apparatus according to claim 1, wherein the upstream side of said fluid guiding member as viewed in the direction of rotation of said rotating member, has an inclined surface.

10. An apparatus according to claim 9, wherein the downstream side of said fluid guiding member as viewed in the direction of rotation of said rotating member, is formed to extend radially toward the center of said container body.

11. An apparatus according to claim 1, wherein said container lid has an inner diameter equal to or greater than that of said container body.

12. An apparatus according to claim 1, wherein said communication passage includes a circular or an elliptic hole.

13. An apparatus according to claim 1, wherein the opening brim of said container body is partially recessed to form said communication passages and wherein said fluid guiding members are formed of the inner peripheral surface of said container body.

14. An electric food preparation apparatus comprising: an electric motor; a main body containing said electric motor; a container body mounted on said main body; a rotating member adapted to be rotatively driven in said container body by said electric motor, and a container lid adapted to be mounted on said container body to cover the upper opening of said container body, said container lid being so structured as to fit its opening brim to the inner periphery of said container body in such a manner that an annular cavity is formed in the fitting portion between said container body and said container lid, the opening brim of said lid is partially projected outwardly to form recesses, and communication passages are formed in said opening brim of said container lid at upstream sides of said recesses as viewed in the direction of rotation of said rotating member.

* * * * *